(12) United States Patent
Vial et al.

(10) Patent No.: US 6,802,664 B2
(45) Date of Patent: Oct. 12, 2004

(54) PRODUCTION OF A FRONT PORTION OF A WRITING INSTRUMENT, COMPRISING A ONE-PIECE PREFORM

(75) Inventors: Siegbert Vial, Burgwald (DE); Erich Gantlert, Gross-Binberau (DE)

(73) Assignee: Merz & Krell GmbH & Co., KGaA, Gross-Bieberau (DE)

( * ) Notice: Subject to any disclaimer, the term of this patent is extended or adjusted under 35 U.S.C. 154(b) by 0 days.

(21) Appl. No.: 10/169,887

(22) PCT Filed: Jan. 10, 2001

(86) PCT No.: PCT/DE01/00069

§ 371 (c)(1),
(2), (4) Date: Jul. 10, 2002

(87) PCT Pub. No.: WO01/51269

PCT Pub. Date: Jul. 19, 2001

(65) Prior Publication Data

US 2002/0192006 A1 Dec. 19, 2002

(30) Foreign Application Priority Data

Jan. 10, 2000 (DE) .......................... 100 00 580

(51) Int. Cl.[7] .............................. A46B 5/02; B28B 5/00
(52) U.S. Cl. .......................... 401/6; 264/241; 264/267; 264/271.1
(58) Field of Search ........................ 401/6, 195; 16/430; 264/239, 241, 250, 251, 255, 267, 271.1

(56) References Cited

U.S. PATENT DOCUMENTS 6,056,462 A * 5/2000 Fukai et al. ............... 401/6
6,062,753 A 5/2000 Hadtke et al. .............. 401/6
6,479,005 B1 * 11/2002 Hsien ........................ 264/219

FOREIGN PATENT DOCUMENTS

| DE | 82 07 627 U1 | 7/1982 | |
| DE | 93 18 711 U1 | 3/1994 | |
| DE | 199 36 177 A | 2/2000 | ........... B43K/23/00 |
| JP | 06 015686 A | 1/1994 | ........... B29C/45/14 |
| JP | 11 019969 A | 5/1999 | ........... B29C/45/14 |
| JP | 11 03 4569 | 9/1999 | ........... B43K/3/00 |

OTHER PUBLICATIONS

Patent Abstracts of Japan, vol. 18, No. 220 (M–1595), Apr. 20, 1994.
Patent Abstracts of Japan, vol. 1999, No. 4, Apr. 30, 1999.
Patent Abstracts of Japan, vol. 1999, No. 5, May 31, 1999.
[Copy of DE Search Report in corresponding application is attached.]

* cited by examiner

Primary Examiner—David J. Walczak
(74) Attorney, Agent, or Firm—Duane Morris LLP

(57) ABSTRACT

A housing of a writing instrument for holding an elongated refill has a front portion with a sleeve body made of an inelastic shape-retaining material, carrying a jacket made of an elastic second material, especially to function as a grip. The grip is formed on the sleeve body and extends along a substantial axial length. The grip is affixed by injection of the second material through an opening at a front of the sleeve body forming a starting end of an adjoining axially extending injection channel. One or more radially or laterally oriented apertures in the sleeve body connect to the injection channel and deliver the second material to the outer surface of the sleeve body.

43 Claims, 6 Drawing Sheets

Schnitt II-II

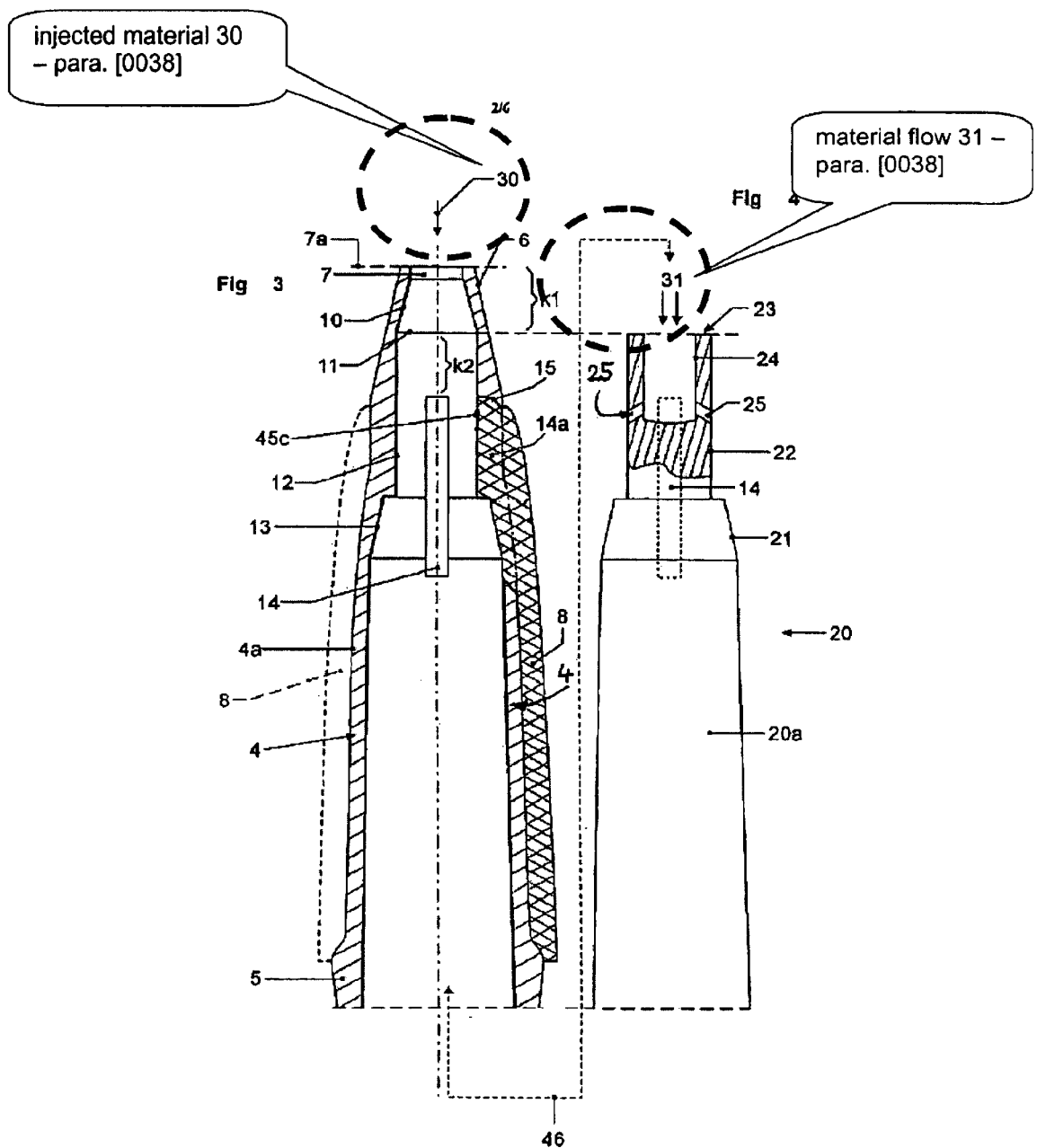

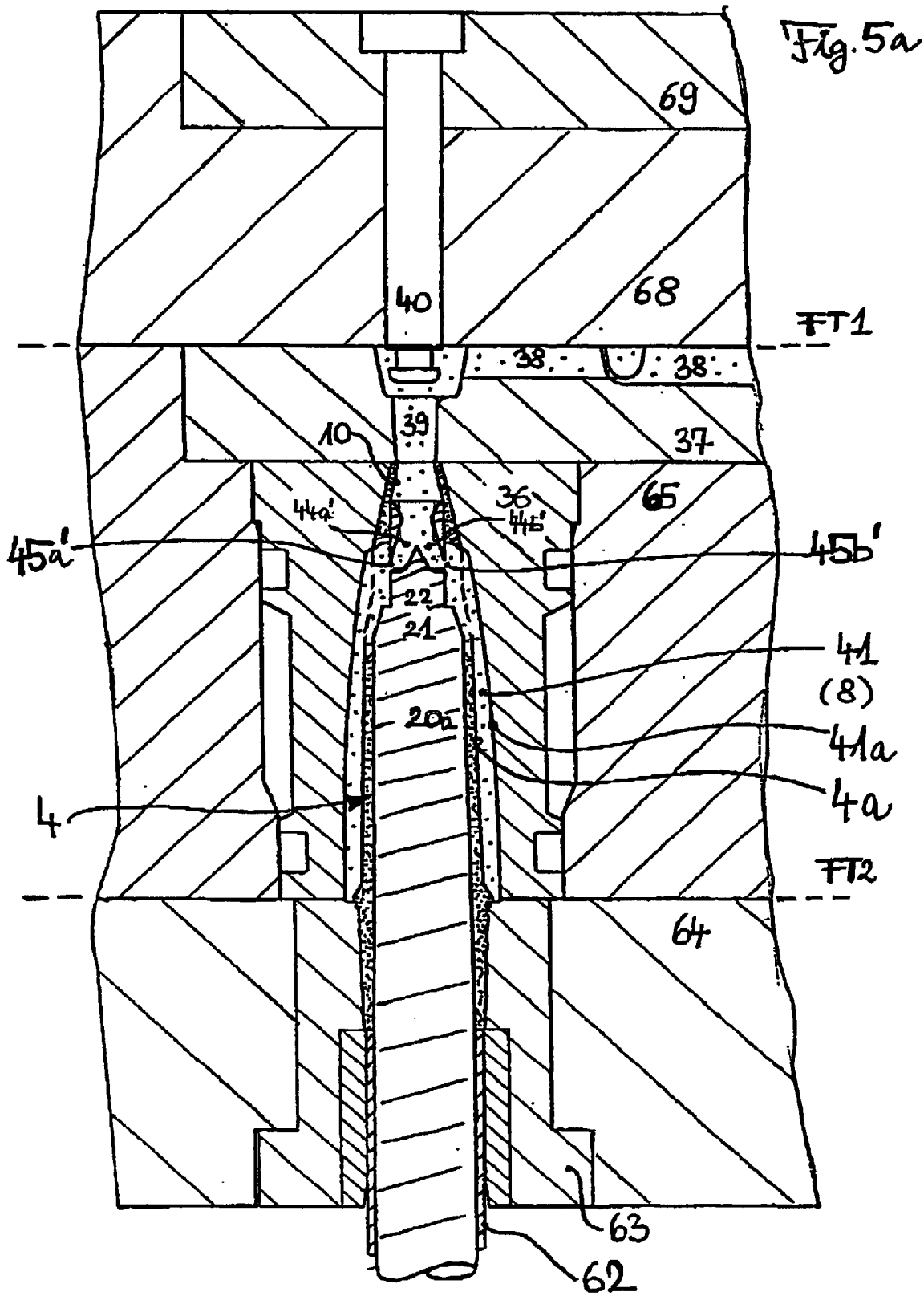

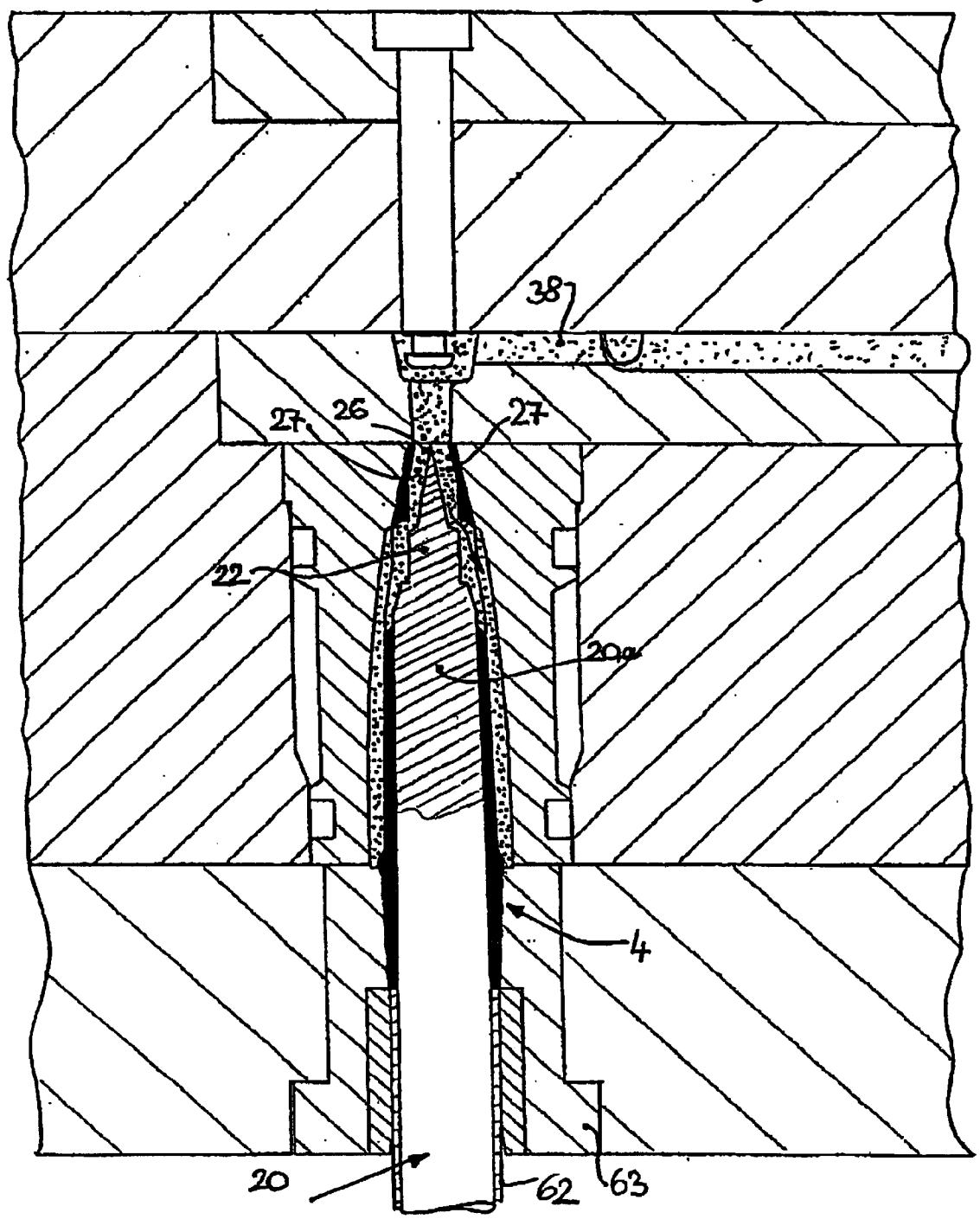

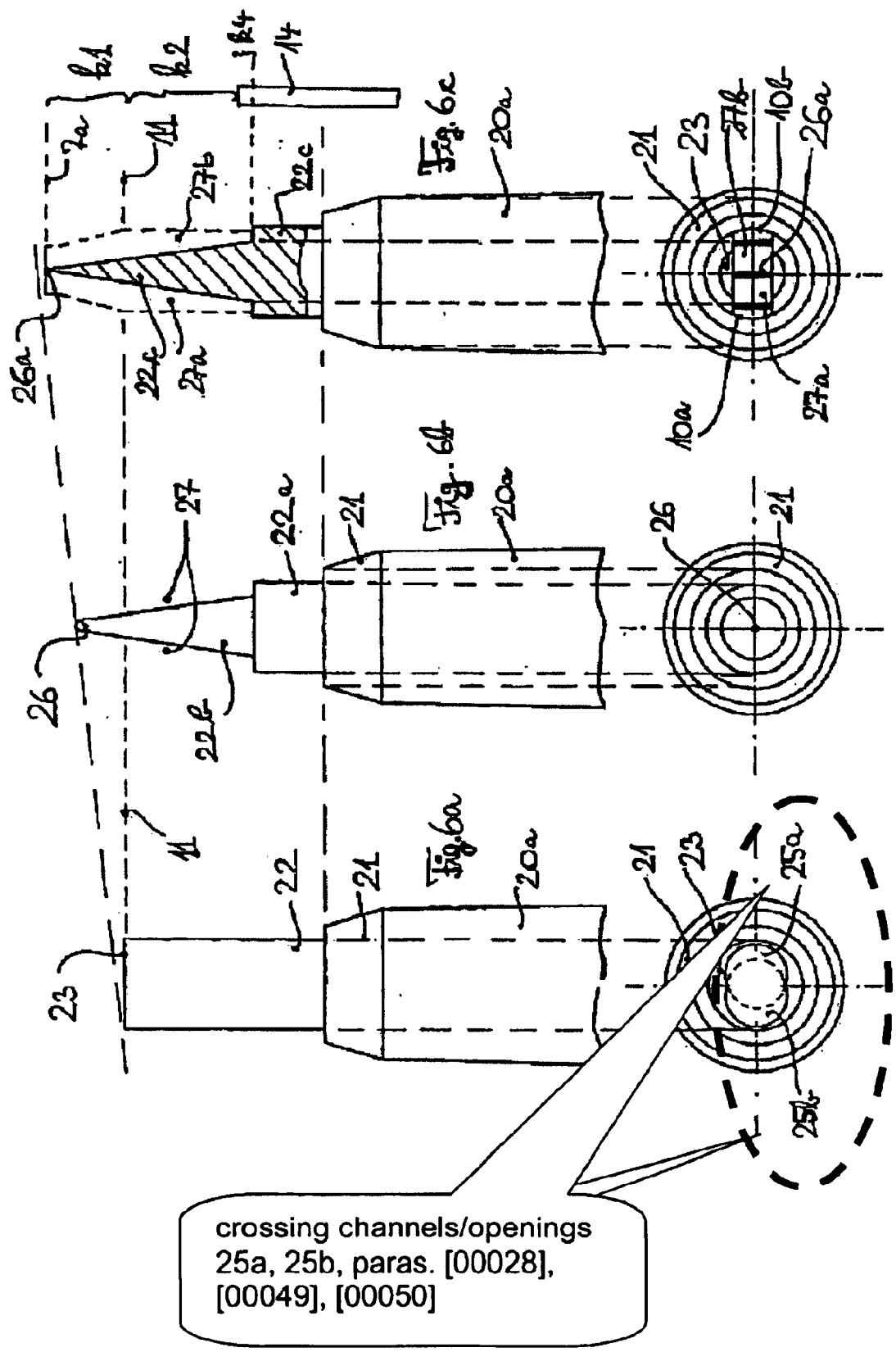

PRODUCTION OF A FRONT PORTION OF A WRITING INSTRUMENT, COMPRISING A ONE-PIECE PREFORM

BACKGROUND OF THE INVENTION

The invention relates among others to the production of a front portion of a housing or for a housing of a writing instrument having a refilling device (refill), said front portion comprising a sleeve body made of a shape-retaining material (preform) and a jacket covering a surface of said sleeve body along a substantial part of a length thereof, said jacket being made of a material having elastic gripping properties. When said writing instrument is used, said jacket serves as a gripping zone which is adapted to give a good hold to a user's fingers. For this purpose, the outer surface of said jacket can also have a conical extension. Said jacket can be adapted to have an elastic ductility appropriate to the purpose.

In writing instruments comprising a front part that, for a better handling, is mostly adapted to have a conical extension, sprue portions of elastic materials cause problems, since the material tears off uncontrolledly when being separated or detached from a mold. Therefore, efforts are made to hide said sprue portions. When hiding said sprue portions and when covering a front part of a writing instrument at an outside thereof from an inside and through walls thereof with a material that has elastic gripping properties, a conducting channel for a thermoplastic melt cannot be adapted to extend through a refill opening (refilling device opening or guiding and penetration opening), since said opening is adapted to usual refilling devices, thus having a diameter which is too small for sufficiently economically providing a guiding channel with cores. Therefore, it is necessary to adapt a front portion of a front part of a writing instrument to have a larger diameter for initially applying a circumferential jacket made of a material that has elastic gripping properties around said front portion, and for subsequently, in a further working step, applying a tip portion by ultrasonic welding or friction welding. Only then, said subsequently provided tip portion can be adapted to have a diameter at a front end thereof which is small enough to laterally support the refilling device.

Therefore, a one-piece sleeve body cannot be used, on the contrary, due to production processes, a two-piece sleeve body is inevitably required, said sleeve body comprising a first portion and a tip portion applied subsequently. An object of the invention is to reduce the cost for producing such front parts of writing instruments, and further to keep sprue portions of soft parts hidden, even if a one-piece sleeve body is used as a blank for receiving a portion which is applied circumferentially (said portion having elastic gripping properties).

SUMMARY OF THE INVENTION

In order to simplify production and to reduce production cost, the invention provides a penetration and guiding portion at the tip of a sleeve body (refill opening), said portion being adapted as a portion of an injection channel for a material of an outer jacket, said material having elastic gripping properties, at least partly circumferentially in a radially outward direction, without a metallic support of a ram-shaped core which is (relatively) moved into said sleeve body in front of a rear end thereof. Said core either starts only behind said channel segment of said blank, at or from a diameter allowing a practical application of a material conduit in said core, or has a channel conduct that is open towards an outside.

Said sleeve body has at least one aperture in a jacket portion thereof through which a material forming a gripping zone is conducted from an inside towards an outside, from said injection channel segment to an outer circumferential portion of said sleeve body. One of said penetration and guiding opening at said tip of said sleeve body and an adjoining portion of said inside of said sleeve body can be adapted as a portion enlarging towards said inside of said sleeve body or as a portion having an undercut.

Due to said properties and to the ability of injecting a material supplied as a second material, particularly a thermoplastic elastomer, by using a two-component injection molding technology through a refill opening provided in said sleeve body to a circumferentially limited extent, said sleeve body itself can be provided in one piece—without a weld or a connecting seam—, thereby substantially simplifying and accelerating the production of a front part of a writing instrument, and thus reducing production cost.

For obtaining a better attachment by complementary shapes between said jacket and said sleeve body, said sleeve body can be provided with at least two apertures distributed over a circumference thereof, said apertures being filled in when forming (injection molding) said surface-covering jacket. For improving said connection, at least one of said apertures can be provided with a contour enlarging from and outside towards an inside thereof; since there is no material bond between the two materials of said two-component injection molding technology (the materials do not stuck together), a better support of said circumferential jacket at said—inside located—shape-retaining sleeve body is obtained by said mechanical arrangement, said support also having a surface effect.

A production in two-component injection molding technology comprises a first component for producing a shape-retaining sleeve body of a relatively brittle plastic material, such as ABS; a second component serves for producing a jacket and uses a thermoplastic elastomer (TPE). Initially, a shape-retaining sleeve-body is produced, said sleeve body comprising a penetration and guiding opening (for a refilling device inserted later) and at least one, preferably two apertures in a circumferential wall thereof. An elastomer forming an outer jacket is applied along a considerable length—a multiple of the diameter of said refill opening—of said circumferential wall, far into a tip portion, said elastomer being injected through a penetration and guiding opening of said sleeve body into an inner space thereof, particularly being contactingly supported and conducted, for being guided from said inner space through said aperture(s) towards an outside onto a circumferential wall of said sleeve body, and for being shaped on said circumferential wall to obtain a continuous circumferential jacket.

It is not disturbing that, after penetrating into the penetration and guiding opening inside said sleeve-body, the stream of said second material, when being injected, is initially enlarged in cross-section, said second material being only subsequently conducted to an outside through an aperture of said preform. During production, said penetration and guiding opening (refill opening), which has one of a cross-section enlarging towards an inside of said sleeve body and an undercut, is blocked by an inserted core as of an axial position, said position being located behind, particularly markedly behind a front end of said refill opening. Thus, said refill opening (tip opening) forms part of an "injection channel" conducting a melt of said second material, and can therefore be small in diameter—corresponding to a refilling device inserted later—without opposing a too high flow resistance to said injection process in a post pressure phase. Inserting a core extending to a front end for guiding said melt is dispensable.

A particular embodiment of a top portion of said core can result in said core still extending further into said tip portion, up to said refill opening, nevertheless maintaining the inventive idea. However, in said portion, no inside guiding channel of said core is required, said core having a metallic outside cover, on the contrary, at least one portion of a circumference (in case of laterally open channels) or the entire circumference (in case of a core having a conical top portion) of said inside surface of said sleeve body is used for closing the guiding channels left open by said top portion of the core. Said guiding channel can have an annular shape. A plurality of combinations are possible, starting from a shorter core not extending completely up to said refill opening, but leaving an axial length free. At least one wall piece of a guiding channel is provided forming an axially and circumferentially extending wall portion of a guiding channel, said guiding channel receiving the melt of said second material and conducting it to a respective aperture. A length of said respective wall piece is at least one half of a diameter of said refill opening, said length particularly being larger than said diameter of said refill opening.

Being located at an inside, the sprue portions (separating portions) of said jacket having elastic gripping properties are allowed to tear off uncontrolledly upon separating sprue channels, thus not disturbing the handling nor the outer appearance.

Said sleeve body can be embodied in one piece, even if a front opening thereof is adapted to a usual diameter of a refilling device, thus being too narrow for additionally receiving a core which, additionally, would have to comprise an inner channel for transporting a softened plastic material. By simultaneously using a short, but marked portion of said tip as a guiding channel segment (also "sprue channel segment"), it is ensured that no additional narrow portions occur in the entire flow channel, so that during the injection process, a post or dwell pressure phase can be effected without problems to compensate a shrinkage of said second material. Nevertheless, a second production step required by additionally attaching a conical tip portion is dispensable, which has a favorable effect on the production cost.

A further advantageous effect of the invention is that the gripping zone can extend further into said tip portion, since a subsequent attachment of a tip portion having a length of about 1.2 to 1.5 cm is not required. In principle, it would even be possible to approach said elastic gripping zone from outside substantially completely towards said refill opening, so that no visible blank of a more solid plastic material protrudes out of said gripping zone at a front end thereof any more.

Even a mold separation of a material thus injected which uses a refill opening predetermined by a diameter of a refilling device as a channel segment, is absolutely reliable, even if a usual sleeve body is provided with a refill opening having a shape enlarging towards an inside. If said material has elastic gripping properties, even in a solidified state, it can nevertheless be removed in an axially forward direction, the connection portions being located inside shearing or tearing off. Preferably, said connection portions can have a much thinner shape than the remaining channel portion, said connection portions nevertheless hardly having any influence on the dwell pressure phase since they have a very short length.

An additional improvement of said separation is obtained by correspondingly embodying the distribution channel pieces which are provided in a core such that they radially deflect said TPE melt supplied through said channel segment of said sleeve body. If they comprise cut edges or at least sharp upper edges, a cull or slug or sprue can easily be removed by a puller core, even if said refill opening comprises a conical portion in a cone being adapted to extend in an opposite direction with respect to a removal direction. Conical openings in a core are advantageous.

A sleeve body comprising a plurality of apertures distributed over a circumference thereof serves for attaching or fixing said jacket at a plurality of positions of said sleeve body, all apertures being filled in with said jacket material. However, said thermoplastic material needs to be conducted out of said injection channel of said sleeve body only through one ore two of said apertures, the remaining apertures being filled in from outside, from said jacket portion.

Inserting said core into said sleeve body has to be effected carefully, insofar as said sleeve body can be provided with a conical thread and can therefore easily be ejected from its support by axial forces when said shaping space has not yet been closed. In order to avoid this, said sleeve-shaped blank is initially moved into said shaping space, preferably by a pivoting movement, and received in its support, said core being inserted partly but not completely into said blank, preferably by about 80% to 90%. Thereupon, a molding or shaping plate is closed, said plate supporting an injection cavity, allowing said sleeve-shaped blank to be supported at a front end by a circular or an annular support line. Said blank having been supported, said core is completely inserted, without ejecting said—now supported—blank from its support.

BRIEF DESCRIPTION OF THE DRAWINGS

In the following, the invention is specified and supplemented in more detail on the basis of embodiments.

FIG. 3 is a longitudinal section through a portion 1 as shown in FIG. 1.

FIG. 4 is a lateral view of a core 20 insertable when injecting a second material, for further conducting and distributing said injected material.

FIG. 5a is a detail of the injection molding tool according to FIG. 5 with an inserted blank 4 and an alternative core 20.

FIG. 5b is a detail of the injection molding tool according to FIGS. 5,5a having a further alternative core 20.

FIG. 6a shows an embodiment of a top portion of a core (core head) according to FIG. 5a, wherein two openings 25a,25b crossing one another and extending at an angle are provided in said head portion 22 of said core, said openings additionally being slightly conical.

FIG. 6b is a detailed view of a core head 22a of the core 20 to FIG. 5b, said core head having a conical portion 22b for forming an annular guiding channel 27 which is roughly illustrated in FIG. 6b, however visibly results from an inserted state of said core according to FIG. 5b.

FIG. 6c is yet a further embodiment of a top portion 22c of a core, which—as in all FIG. 6—is visible from the illustrated top plan view in an axial direction. When inserting the core of FIG. 6c into the tool of FIG. 5, two axial channels 27a,27b which are axially oriented but circumferentially limited in relation to FIG. 6b, have the effect that a respective portion 10a,10b of a conical portion 10 according to FIG. 3 serves as a radially outer limitation of a respective guiding channel, thus as an outer wall thereof, even if said core protrudes further into a refill opening according to the comparison of FIGS. 6a, 6b and 6c.

DETAILED DESCRIPTION

Figure 1:
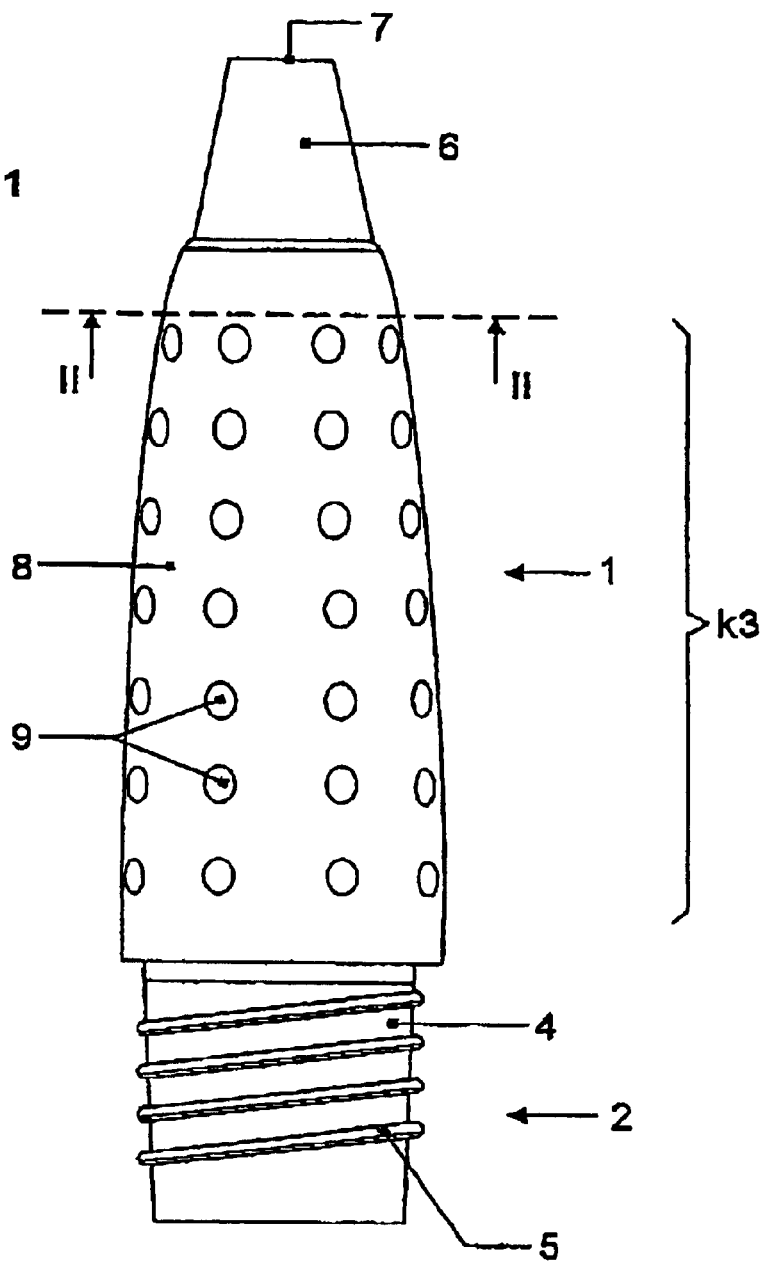
FIG. 1 is a lateral view showing a front portion 1 of a sleeve-shaped housing for a writing instrument having a refilling device—which is not illustrated.

According to FIG. 1, a front portion 1 of a writing instrument housing, which is not illustrated, comprises an inner sleeve body 4 made of a shape-retaining (solid) plastic material and a jacket 8 made of a thermoplastic elastomer and covering a part of the length of said sleeve body 4. Said jacket extends between a tip portion 6 of said portion 1 and a rear connecting portion 2 which can for example be provided with a thread 5. Said tip has a penetrating and guiding opening 7 through which a front end of an elongated refilling device protrudes—at least in a writing position—said refilling device being laterally guided and supported; therefore, said opening is designated as "refill opening".

Said surface-covering jacket 8 can be structured on an outer surface thereof for increasing the gripping property, for example being provided with a plurality of small recesses 9 or protruding naps. Structurally, said second material forming said jacket has elastic gripping properties for improving the main function of holding the writing instrument at a gripping zone thereof.

In an axial longitudinal portion k3 which is surrounded or covered by said jacket 8, said sleeve body 4 is provided with at least one wall aperture 14. According to the embodiment shown in FIG. 2, four narrow and elongated slots 14 are provided as apertures, said slots being uniformly distributed in a circumferential direction. In a finished state, said apertures are completely filled in 14a with the material of said jacket 8, thus forming a form-fitting connection (by complementary shapes)—not a bond by material—between the elastomer jacket material and said sleeve body 4.

Figure 2:
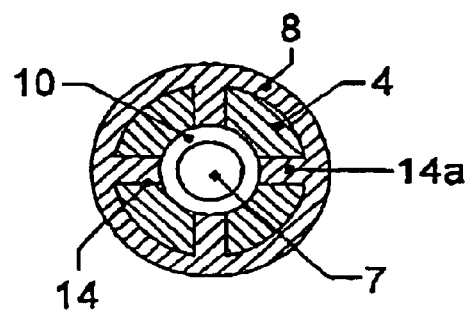
FIG. 2 is a cross-section along a cutting plane II—II of FIG. 1.

In order to reduce the risk of a separation of said two parts 4,8 in a radial direction, at least one peripheral surface or one of said apertures 14 can have an undercut from the outside towards the inside, as shown at 15, at the support webs 14a in FIG. 3. With reference to FIG. 2 it is visible that in FIG. 3, said sleeve body is cut on the left side in a plane which is pivoted by 45° in relation to the cutting plane on the right side of FIG. 3.

Figure 5:
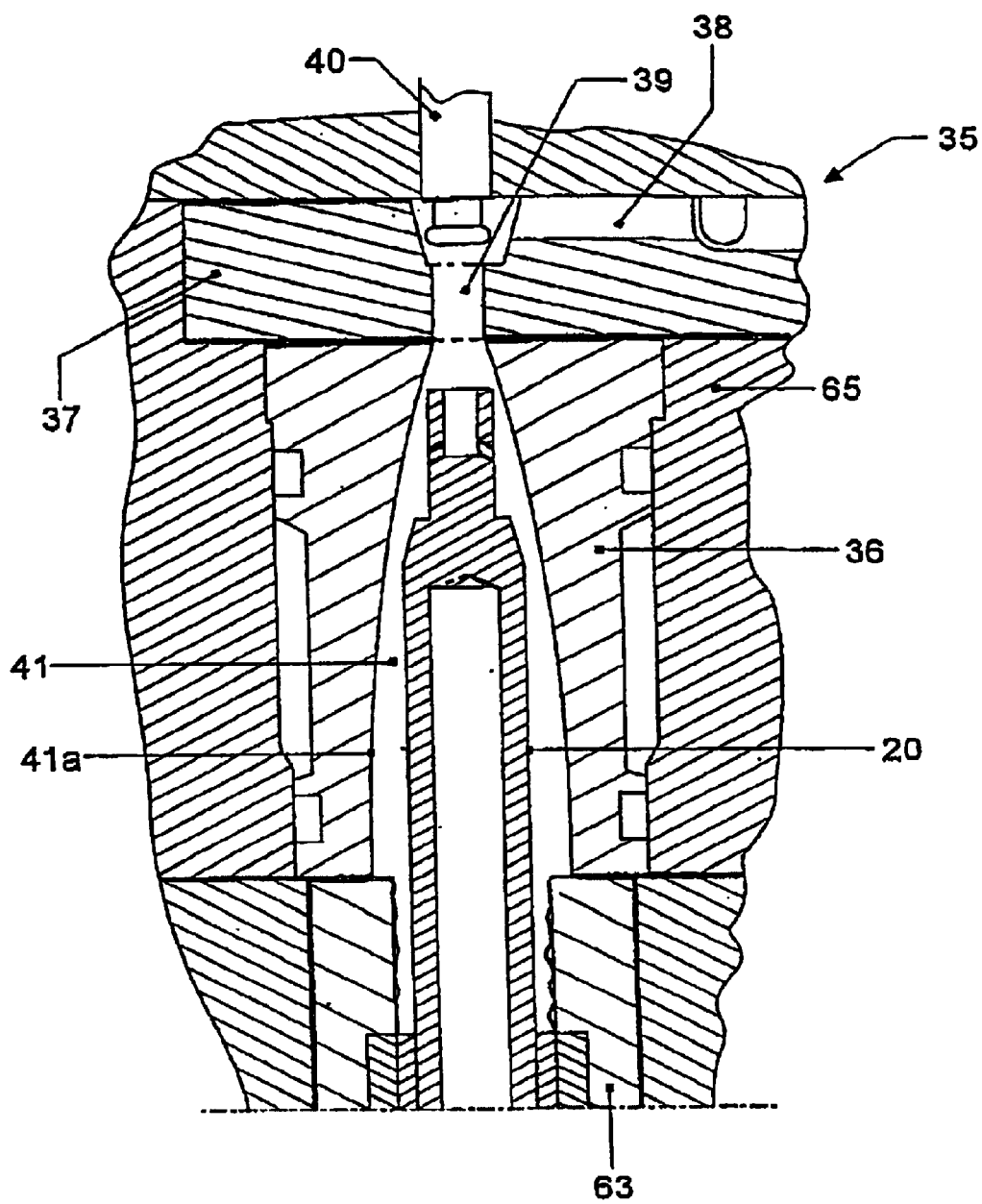
FIG. 5 is a longitudinal section through an injection molding tool used for applying a jacket by injection molding.

FIG. 5 shows an injection molding tool 35 for applying a jacket by injection molding, said tool being illustrated with an inserted core 20, however, without said sleeve body which forms part of said injection mold for shaping said jacket. Said core 20 forms a shaping space 41 together with an inner portion 36 of said mold, said shaping space being filled in with a prefabricated sleeve body 4 and a jacket material 8 to be injected.

It can be seen from FIG. 3 that a tip portion 6 adjacent to said refill opening 7 of said sleeve body is conically enlarged 10 along a length k1. Said enlargement terminates at a plane 11. As from said plane, the inside surface 12 of said sleeve body 4 is cylindrical. Behind said cylindrical portion 12, said surface is once again conically enlarged at 13, subsequently extending cylindrically or enlarging slightly up to a thread 5. Apertures 14 are located at a distance k2 from an end 11 of said first enlargement 10. An outer wall 4a of said sleeve body 4 carries said jacket 8.

An outer mold comprising multiple parts according to FIG. 5 serves for injecting said jacket material, said mold shaping the outer appearance or form of said jacket 8, whereas a mandrel or die 20 (in the following designated as core), as shown in FIG. 4, can be inserted into the inside of the prior-shaped sleeve body 4, said core nearly completely filling up the inside of said sleeve body 4. Said core 20 is adapted to the inner shape of said sleeve body 4 and comprises a conical portion 21 adapted to a surface 13 and a top or head portion 22 protruding into said cylindrical portion 12 and being adapted thereto, said top portion comprising a face end surface 23 and a body portion 20a which is very slightly conical.

Said face end surface 23 of said core 20 terminates in an injection position at said plane 11 in front of said conical enlargement 10 of said tip portion 6 of said sleeve body 4, thus substantially at a distance k1 from said refill opening 7.

Thus, in said injection position, the inside space of said sleeve body 4 is filled practically up to said plane 11 with said die 20. Together with said enlargement 10, said refill opening 7 forms an injection channel along a length k1 for the injection process of the thermoelastic jacket material, into which injection channel said second material can be injected through channels 38,39 of said injection mold from a face end thereof. Below said injection channel segment 7,10,k1, said die 20 is provided with an opening 24, forming a receiving and distributing channel segment for said injected material 30 together with lateral outlet openings 25, through which openings a material flow 31 is conducted to at least one of said apertures 14. Preferably, said distributing openings 25 are X- or V-shaped and start directly at said face end 23.

It can be seen from FIG. 4 that in an inserted state, said distributing openings 25 end in an area of at least two apertures 14 being located opposite of each other. Also, all apertures can be connected with said receiving channel segment 24. However, it is also sufficient to fill up some of said apertures 14 from said outer shaping space 41, i. e. from the outside towards the inside.

Figure 7:
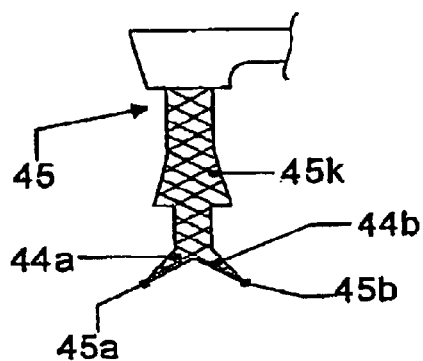
FIG. 7 illustrates a cull or sprue 45 which has been removed in an axially outward direction through an injection opening after finishing a front portion, said sprue inversely illustrating the shape of a refill opening 7,10 of a preform.

In connection with said core 20, said sleeve body 4 comprising said apertures 14 is adapted such that when separating or removing at least one of the die and the shaped front portion 1 from said injection mold, said material having elastic gripping properties is separated from, e. g. torn off or sheared off, said jacket shaped at said sleeve body and from said thermoplastic material 14a filling in said apertures 14, said separation occurring at a peripheral surface between an inner circumference of said channel piece 24 of said core 20 and said sleeve body 4, so that a connection portion 45c remains. Thus, a coherent cull or sprue 45 remains which is hardened in the channels 38,39 of said injection mold and in said injection channel 7,10 of said sleeve body 4 as well as in said distributing channel(s) 24,25. For example, said sprue or cull is removed from said channel segment 7,10,24,25 in an outward direction using a puller core 40. Said cull or sprue remainder 45 is illustrated in FIG. 7. Said removal does not cause any problems despite the cone-shape 45k of said injection channel, since a corresponding elastomer material is used for said jacket, and the distributing channels 44a,44b are separated at 45a,45b. Here are the thin portions of the injection molding channel.

Further components of an injection arrangement 35 are visible in FIG. 5a, said arrangement comprising an alternative core which will be described later. The path of the material to be injected is indicated by arrows in FIGS. 3,4. The procedure of positioning a blank 4 on a core 20 is indicated by an arrow 46 for illustrating the relative position of said apertures 14 in relation to said core in FIG. 4.

A more detailed illustration of said injection arrangement 35 is given in FIG. 5a, said illustration comprising one blank 4 out of a plurality of blanks inserted in parallel (dotted) and a jacket 8 already shaped (dotted less densely), by radially oriented apertures 14 for forming support webs 14a, in this case more clearly visible, comprising X-shaped distributing channels 25 starting from a face end 23 of said core 20, from where a channel segment is formed by said sleeve body 4 along a portion k1. At a lower edge of said shaping space 41, said sleeve body is radially received by an insert 63 in a thread portion 5. Said insert is moved from a first injection molding process by a rotating plate 64, positioning said sleeve body below a shaping plate 65 moved axially upward, and, prior to closing said tool, said rotating plate 64 relatively moves said sleeve body 4 (also by an axial lowering movement of said shaping plate 65) into said shaping space 41 which is formed by an inner shaping insert 36 (finishing insert) having an inner surface 41a simultaneously defining the shape of an outer surface of said jacket 8.

When inserting a core 20, an ejection sleeve 62 is also applied inside a bushing at an axial end of said thread 5, for allowing a finished front portion to be ejected subsequently, after said shaping plate 65 has been lifted again.

For avoiding an early detachment of a thread 5—which in this illustration has conical shape—of said blank when inserting said core 20, said core initially does not penetrate completely into said blank 4, stopping its penetration movement into a cylindrical portion 12 according to FIG. 3 at the beginning of said front portion 22 with said crossed channels at the latest. Prior thereto, said shaping plate 65 comprising said injection insert 36 is completely placed upon said rotation plate 64, so that the mold is closed. Then, said blank 4 is not in a position to deflect in an axial forward direction being supported either by an additional distribution plate 37 or by an inner wall 41a of a cavity 41 such that said penetration movement of said core 20 can be completed without said thread detaching from a thread support 63 of said blank 4.

An injection process starts after said mold has been closed completely and all illustrated plates 64, 65, 37, 68 and 69 have been placed upon one another.

An elastomer material is injected into said refill opening of said sleeve part 4 through channels 38,39 over a distribution plate 37 which is in surface contact above said shaping plate 65. Above said distribution plate 37, a stripping plate 68 is provided, and thereabove a further plate 69 for actuating said puller core 40 is located.

After the injection process of said elastomer having been terminated and after said elastomer having cooled down or hardened, firstly said ejection plate 68 is moved in an axially upward direction, separating the entire sprue portion 38,39, 10,25, as illustrated in FIG. 7, from the front part of said sleeve body and from the distribution plate 37 over said puller core 40. Said sprue remains in contact with said plate 68 and can also be separated therefrom by relatively moving said plates 68,69. Thin portions 45a,45b at a transition of said supply channel to webs 14a of said jacket 8 form said separating portions which are torn off by said puller core 40 when lifting said plates 68,69. After lifting said plates 37,68,69, said shaping plate 65 is also lifted, said core 20 is moved out of said readily shaped part, and said front portion is completely separated from said mold over said ejection sleeve 62. Thereupon, said rotation plate 64 is again pivoted back such that said insert 63 is positioned in a portion of said tool in which a preform 4 is produced using said first material.

Two separation planes FT1 and FT2 are illustrated in FIG. 5a, said first separation plane being a sprue separation plane, in which the hardened supply channels of said thermoplastic elastomer are separated, whereas said second plane FT2 is the main separation plane for separating the mold and releasing the finished part.

An alternative core 20 according to FIG. 5a, which so far has only been mentioned briefly, a front portion of which core is different from the embodiment according to FIGS. 4,5, shall be described in more detail with reference to FIG. 6a. Up to a conical portion 21, said core 20 is identical with that of FIG. 5. Only a top portion 22 is modified with respect to an extension of the channels 25a,25b. FIG. 6a shows said channel extension in an axial top plan view, and FIG. 5a is a cross-sectional illustration of said channels. Two crossing channels 25a,25b are shown, said channels having a slightly conical shape and extending at an angle of 10°. Said channels extend from an end surface 23 and terminate in front of a conical portion 21. To be more exact with respect to an aperture 14, said channels terminate at a radially outer wall of a portion 22 of said core, at a distance k4 from the beginning of said aperture 14. An overlap k4 ensures that the softened material for said jacket 8 reaches said aperture 14. FIG. 5a shows thin portions 45a' and 45b' being present in a direction towards an edge at a lower end due to said channels 25a,25b being partly provided as blind holes.

In the described embodiment of the channels continuing in said core 20, a sprue remainder is formed, said sprue being correspondingly modified with respect to FIG. 7, but nevertheless having two connection arms 44a' and 44b', said arms, for simplifying a mold separation at a (relative) backward movement of said core, reflecting the conical shape of said holes 25a and 25b, when (relatively) moving said core back and using said thin portions 45a' and 45b' as separating portions.

FIG. 5b shows a further embodiment of a top portion 22 of said core, said embodiment for the rest being identical with that of FIG. 5a as far as the shaping tool is concerned. Also, a blank 4 is inserted into an injection cavity 41, the path of said second material being marked by an arrow, said second material being conducted through an aperture 14 in said blank 4. FIG. 5b illustrates that an axial longitudinal extension of said core, due to a conical shape 22b of said top portion according to FIG. 6b, practically reaches an opening 7. Despite said core having an enlarged extension in an upward direction, a circumferential guiding of said channel portion along a length k1 and also of an additional channel portion along a length k2 remain, the purpose of which has so far been fulfilled by the inside of said core and by the crossing openings described in FIG. 5a. Said blank, in a tip portion thereof, further comprises a circumferentially extending wall for delimiting the flow of said second material, whereas a radial deflection towards said apertures 14 is obtained due to said core having a conical shape 22 and comprising a top portion 26. According to FIG. 5b in combination with FIG. 6b, a ring channel 27 enlarging in diameter is formed between an outer surface of said cone 22b and an inner wall 10 of said tip portion of said blank 4.

A further embodiment shall be described with reference to FIG. 6c. Said embodiment fits identically on the cores of FIGS. 5,5a and 5b, with a modified top portion 22c, respectively, above a conical portion 21 as shown in FIG. 6c.

It is visible from the top plan view of FIG. 6c that two channels 27a,27b are adapted to extend in an axial direction, said channels not extending completely circumferentially, but only having a limited channel width. Said channels are open in a radially outward direction and are closed at portions 10a,10b by respective opposite inner wall portions of a portion 10 of said blank 4 above a plane 11.

A tip 26a of the embodiment 22c of said top of the core is line-shaped, but it can have a different shape when three or four circumferentially distributed channels (corresponding to said channels 27a, 27b) are present. During injection, said second material is guided in a portion k1+k2, said guiding being effected by a circumferentially delimited portion of an inner surface of said blank. An aperture 14 is only symbolically marked in FIG. 6c with regard to a height and a position thereof, so that in a portion k4, said second material can pass over to an outer portion of said jacket 8 through said aperture—thus into the shaping cavity 41.

Said portion k4 is only a small part of the complete length of said aperture 14, particularly considerably less than one third of a length thereof.

Due to the shaping and method described, said shape-retaining sleeve body 4 can be provided in one piece, so that only two steps and two injection arrangements and no additional assembling steps are required for producing a front portion.

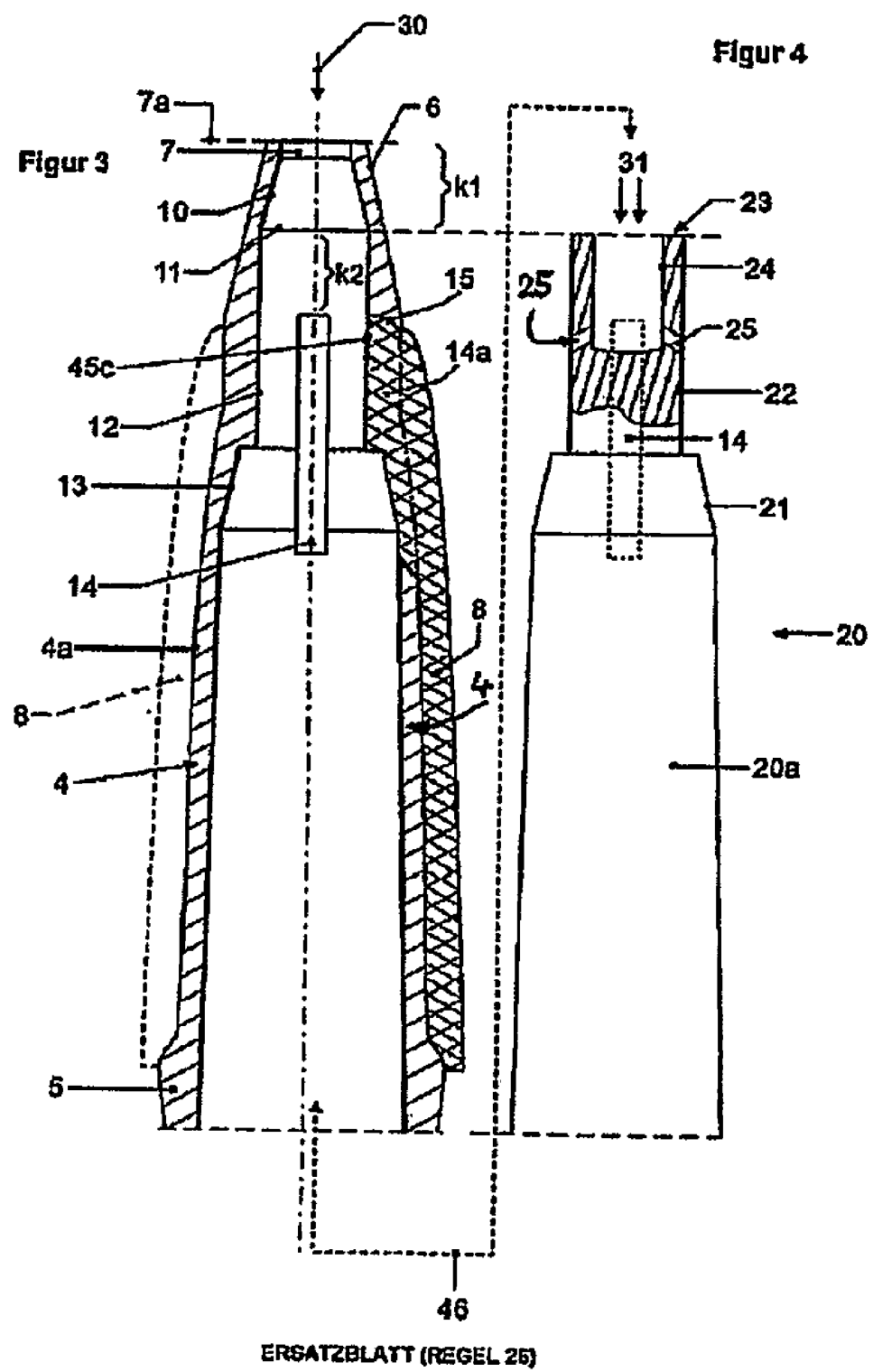

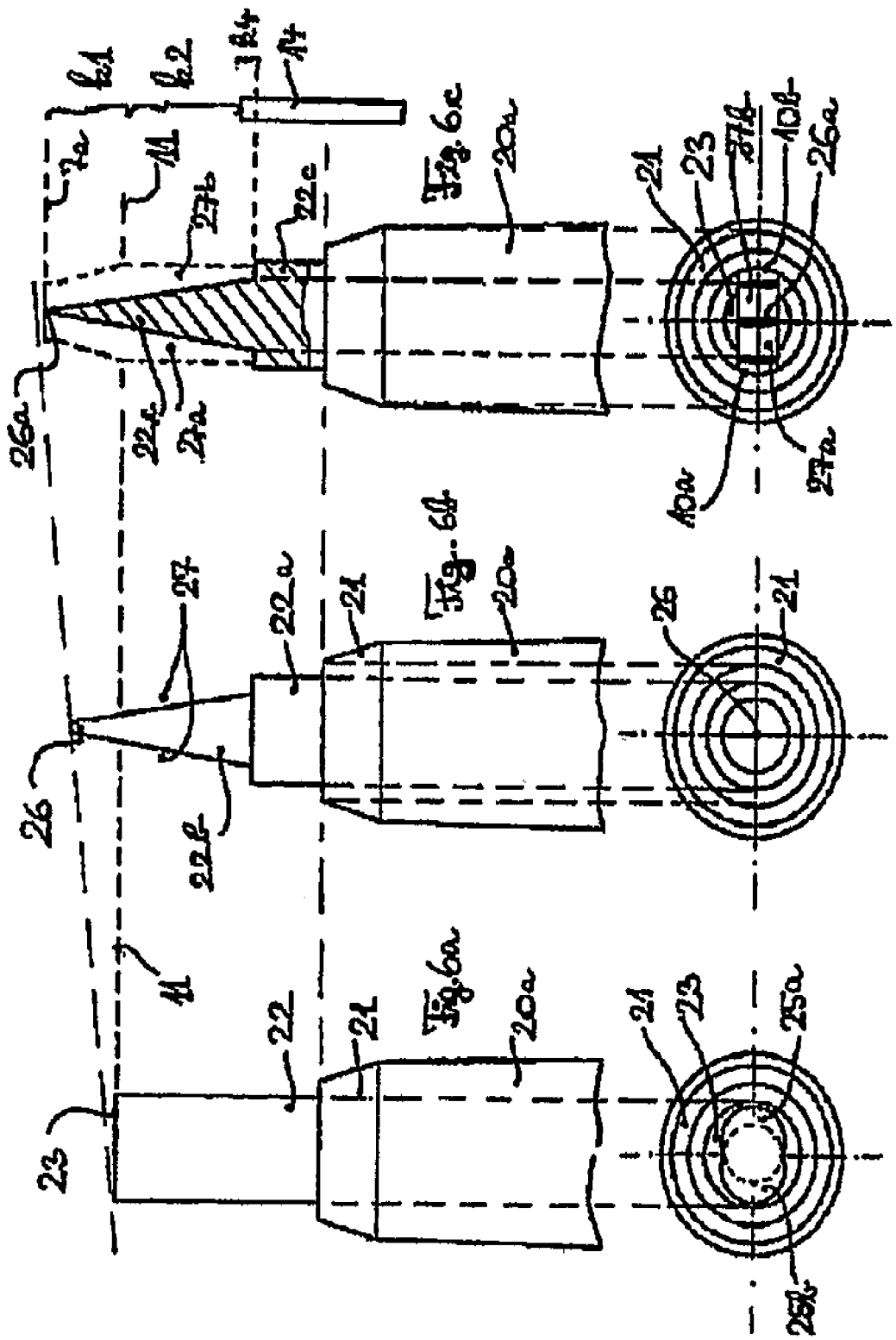

What is claimed is:

1. Front portion of a housing of a writing instrument having an elongated refilling device, said front portion comprising a sleeve body made of a shape-retaining material and a jacket made of a second material, said jacket covering a surface of said sleeve body along a substantial part of an axial length thereof, wherein
   (a) a front opening located at a front end of a tip of said sleeve body is adapted as a starting end of an adjoining axial segment of an injection channel for said second material;
   (b) said sleeve body comprises at least one laterally oriented aperture for laterally delivering said second material to an outer circumferential portion of said sleeve body.

2. Front portion according to claim 1, wherein said axial segment adjoining said opening is adapted as a portion of an inner surface of said sleeve body enlarging towards a rear of the sleeve body.

3. Front portion according to claim 1, wherein said sleeve body comprises two or more apertures distributed over a circumference thereof, said apertures being filled in with said second material for attaching said jacket at said sleeve body to be connected by complementary shapes.

4. Front portion according to claim 1, wherein at least one of said apertures has a contour enlarging from an outside towards an inside thereof.

5. Front portion according to claim 1, wherein said axial segment extends in an axial direction over a limited length, and said segment, in a circumferential direction, comprises at least one circumferential portion of an inner surface of said sleeve body as a wall portion.

6. Front portion according to claim 5, wherein said limited length is longer than at least one half of a diameter of said opening at a front end thereof.

7. Front portion according to claim 1, wherein said axial segment is delimited along an entire circumference thereof in a radially outward direction by a inner wall surface of said sleeve body.

8. Front portion of a writing instrument housing according to claim 1, wherein said axial segment of the injection channel of said sleeve body terminates at an axial distance in front of said at least one aperture, for being connectable with said aperture through at least one distribution channel piece in a front portion of a core which is insertable into said sleeve body in a direction towards said injection channel segment, said distribution channel piece having at least one of an axial, a radial, and an angular orientation.

9. Front portion of a writing instrument housing according to claim 1, wherein a channel piece is provided in a front portion of a core, said core being insertable into said sleeve body in a direction towards said injection channel segment, said channel piece being subordinated to said injection channel segment of said sleeve body and terminating at an axial distance behind said at least one aperture for conducting said second material to said at least one aperture and filling in said aperture therewith.

10. Front portion of a writing instrument housing according to claim 1, wherein said injection channel segment enlarges in diameter starting from said opening along its axial length, from a diameter sized for a front end of a refill and along a length of more than said diameter.

11. Front portion of a writing instrument housing according to claim 1, wherein said material forming said jacket and filling said at least one aperture, from which is separable along an inner circumferential surface over a thin portion suitable for separation by shearing off said material.

12. Front portion according to claim 11, wherein during production said material fills said injection channel and also a subordinated channel piece of said core.

13. Front portion according to claim 11, wherein said inner circumferential surface comprises a thin portion suitable for shearing off, and the thin portion is invisible from outside.

14. Front portion according to claim 1, wherein said second material for said surface-extending jacket is a material having elastic gripping properties.

15. Front portion according to claim 1, wherein said first material of said sleeve body is substantially inelastic in use.

16. Front portion according to claim 15, wherein said first material of said sleeve body comprises ABS.

17. Method for one of producing and shaping a front portion of a writing instrument housing comprising the steps of:
   (a) producing a sleeve body made of a shape-retaining material, said sleeve body defining an opening end of an opening for receiving and radially supporting a refill, and the sleeve body having at least one aperture in a circumferential wall;
   (b) surrounding an outside of the sleeve body circumferentially with a surface-extending jacket made of a material having elastic gripping properties and radially guiding and laterally limiting said material by said opening along an axially adjoining section and conducting the material into an inside of said sleeve body, said material, deflected by at least one channel section in a core, penetrating from the inside into an outer shaping space through said at least one aperture in the circumferential wall of said sleeve body; and,
   (c) shaping said material in said shaping space to build said outer jacket.

18. Method according to claim 17, wherein the sleeve body is produced by injection molding of a shape-retaining, inelastic plastic material.

19. Method according to claim 17, wherein after penetrating into said opening, a stream of a softened second material flows inside said sleeve body, and subsequently is conducted radially outward through said at least one aperture.

20. Method according to claim 19, wherein said stream enlarges in cross-section.

21. Method according to claim 17, wherein said sleeve body is produced by injection molding, and wherein at least one said aperture is left free by a cross-sectional enlargement towards the inside of said sleeve body.

22. Method according to claim 17, wherein said sleeve body is provided with several apertures distributed over a circumference thereof, said apertures being filled in for attaching said jacket at said sleeve body to fit by complementary shapes aside from any bond of material, the material conducted out of the inside of said sleeve body through at least one of said apertures reaching remaining ones of said apertures from an outer shaping space, thereby filling in said remaining ones of the apertures from outside of the sleeve body.

23. Method according to claim 17, wherein prior to injecting said second material, the inside of said sleeve body, except for said opening and said adjoining axial portion, is substantially filled in by a die, for conducting said second material to said at least one aperture.

24. Method according to claim 23, wherein the second material is conducted via one of an inner shaping space in a top of said die, and a shape of the front end of said top which is at least partly circumferentially open.

25. Method according to claim 17, wherein a second material is used, said material being elastically ductile, in a cooled down state, and after injection and hardening, being separated at a transition from an inside of said sleeve body to said at least one aperture.

26. Method according to claim 25, wherein the separation is provided by relatively axially extracting a sprue channel segment and a supply segment thereof, said channel segment leading to said at least one aperture and having at least a partly radial orientation.

27. Method according to claim 25, wherein said removed channel segment has a cone section which is oriented opposite to a mold separating direction and corresponds to an enlargement of said sleeve body.

28. Method according to claim 17, wherein a hardened channel segment made of a second material is removed from an axial section by applying a force, and separated from said radial aperture.

29. Method according to claim 17, wherein said sleeve body is introduced into said shaping space, whereupon a core moves into said sleeve body.

30. Method according to claim 29, wherein
said core for predetermining an injection channel structure in a front end portion of said sleeve body is initially not completely inserted into said sleeve body supported at a rear end thereof,
when closing said shaping space, said sleeve body is supported at a front end by a wall of said shaping space, whereupon said core being completely inserted into said sleeve body without pushing said body out of a support supporting said sleeve body at a rear end thereof.

31. Method according to claim 17, wherein said front portion is a portion of an elongated housing shaft.

32. A tool for one of producing and shaping a front portion of a writing instrument housing, said tool comprising
an injection cavity into which a sleeve-shaped blank having a front opening and a radial dimension that is smaller than said injection cavity is insertable;
an elongated core for substantially filling up said blank at an inside thereof, said core being adapted or having only a limited length such that a remaining axial length remains in front of said core or laterally at a front end thereof, said remaining axial length being delimited by said blank, up to said front opening, for guiding a softened second material supplied through said opening and for delimiting said material in a radial extension thereof.

33. A tool for one of producing and shaping a front portion of a writing instrument housing, wherein the tool has an injection cavity adapted to receive a sleeve shaped blank having a front opening and a radial dimension that is smaller than said injection cavity, said tool further comprising an elongated core for filling up an inside of said blank to support it, said cores having a front end said front end not fully covering a diameter of the front opening, to guide a softened material, supplied through said opening, in a radial extension thereof, by at least one portion of an inner circumference of said blank.

34. Tool according to claim 33, said elongated core having a top portion comprising an inner channel piece, a circumferentially oriented, annular supply channel located at an outside of said top portion or at least one, preferably two radially open channels.

35. Tool according to claim 33, wherein said core, at a front end portion thereof, does not extend into said portion.

36. Tool according to claim 32, wherein said elongated core has a top portion comprising an inner channel piece, a circumferentially oriented, annular supply channel being located at an outside of said top portion at at least one radially open channel.

37. Tool according to claim 36, wherein said top portion is rotationally symmetrical and either has an acute end or said at least one radially open channel has a respective channel bottom which substantially continuously increases in height starting out from a tip in a radially outward direction.

38. Tool according to claim 36, said core, behind a remaining length in front of said core comprises two crossing conical channel bores as an inner channel piece, said bores being adapted to extend at an angle with respect to an axis of said core and protrude laterally out of said core at an axial height of said at least one aperture, for forming separable sprue segments for said second material.

39. A method of shaping a front portion of a housing of a writing instrument, said front portion comprising a refill opening, open at a front end, for receiving and radially supporting a refill, wherein a gripping jacket is attached around a preform body, made of a shape-retaining material, said attaching between the material of said gripping jacket and the material of said preform body not being a bond of materials, and an axial portion of said refill opening serves as a walled guiding channel for the material of said gripping jacket, wherein said material is injected under pressure through said refill opening and shapes said gripping jacket on a surface of said preform body.

40. Method according to claim 39, wherein a diameter of said refill opening corresponds substantially to a diamenter of a refill front end portion.

41. Method according to claim 40, wherein said conducting channel piece, in which said material is conducted by said blank, is longer than a diameter of said front end of said refill opening.

42. Tool for one of producing and shaping a front portion of a writing instrument housing, useful for providing an outer jacket on a sleeve body of shape-retaining material defining an opening for a refill and a circumferential wall with at least one aperture, including conducting a material having elastic gripping properties into an inside of the sleeve body and deflecting the material by at least one channel section in a core so as to penetrate through the aperture from inside the sleeve body, and shaping the material in an outer shaping space to build the outer jacket, said tool comprising an injection cavity into which a sleeve-shaped blank having a front openings and a radial dimension that is smaller than said injection cavity is insertable;

an elongated core for substantially filling up said blank at an inside thereof, said core being adapted or having only a limited length such that a remaining axial length remains in front of said core or laterally at a front end thereof, said remaining axial length being delimited by said blank up to said front opening, for guiding a softened second material which is supplied through said openings and for delimiting said material in its radial extension.

43. Tool for one of producing and shaping a front section of a writing instrument housing, useful for providing an outer jacket on a sleeve body of shape-retaining material defining an opening for a refill and a circumferential wall with at least one aperture, including conducting a material having elastic gripping properties into an inside of the sleeve body and deflecting the material by at least one channel section in a core so as to penetrate through the aperture from inside the sleeve body, and shaping the material in an outer shaping space to build the outer jacket, wherein the tool has an injection cavity adapted to receive a sleeve shaped blank having a front opening and a radial dimension that is smaller than said injection cavity(41), said tool further comprising an elongated core for filling up an inside of said blank to support it, said core having a front end and being adapted at said front end such that along a remaining axial length, a diameter is smaller by an amount to guide a softened material which is supplied through said opening in its radial extension by at least one portion of an inner circumference of said blank.

\* \* \* \* \*

UNITED STATES PATENT AND TRADEMARK OFFICE
CERTIFICATE OF CORRECTION

| | | |
|---|---|---|
| PATENT NO. | : 6,802,664 B2 | Page 1 of 3 |
| APPLICATION NO. | : 10/169887 | |
| DATED | : October 12, 2004 | |
| INVENTOR(S) | : Vial et al. | |

It is certified that error appears in the above-identified patent and that said Letters Patent is hereby corrected as shown below:

Please remove sheet 2, containing Figures 3 and 4, and Sheet 6, containing Figures 6a, 6b, and 6c, and replace with the corrected Sheet 2 and Sheet 6 as shown on the copies attached hereto.

Signed and Sealed this

Tenth Day of April, 2007

JON W. DUDAS
*Director of the United States Patent and Trademark Office*